(12) United States Patent
Ferren et al.

(10) Patent No.: US 10,466,807 B1
(45) Date of Patent: Nov. 5, 2019

(54) KEYBOARD

(71) Applicant: Pioneer Square Brands, Inc., Seattle, WA (US)

(72) Inventors: Michael Cooper Ferren, Camas, WA (US); Michael Heecheol Kim, Seattle, WA (US); Jaimie Emerald Chan, Renton, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 16/190,139

(22) Filed: Nov. 13, 2018

(51) Int. Cl.
| G06F 3/16 | (2006.01) |
| G06F 3/023 | (2006.01) |
| G06F 3/01 | (2006.01) |

(52) U.S. Cl.
CPC .............. *G06F 3/023* (2013.01); *G06F 3/018* (2013.01)

(58) Field of Classification Search
CPC ....... G06F 3/018; G06F 3/0219; G06F 3/0227
USPC ................ 400/691, 693; 361/679.08, 679.09
See application file for complete search history.

(56) References Cited

U.S. PATENT DOCUMENTS

| 5,197,178 A * | 3/1993 | Lichte .................... G06F 3/0202 206/305 |
| 5,340,955 A * | 8/1994 | Calvillo ............... H01H 13/063 200/302.2 |
| 5,583,742 A * | 12/1996 | Noda ..................... G06F 1/1626 248/632 |
| 6,262,886 B1 * | 7/2001 | DiFonzo ............... G06F 1/1616 345/905 |
| 6,284,978 B1 * | 9/2001 | Pavillard ............... G06F 3/0202 174/97 |
| 7,106,580 B2 * | 9/2006 | Kugimiya ............. G06F 1/1616 248/176.1 |
| 7,319,584 B2 * | 1/2008 | Wang .................. G06F 1/1616 312/223.1 |
| 7,821,782 B2 * | 10/2010 | Doherty ................ G06F 1/1626 361/679.26 |
| 7,938,260 B2 * | 5/2011 | Lin ........................ A45C 11/00 206/320 |
| 8,152,071 B2 * | 4/2012 | Doherty ............... A61B 5/0077 235/454 |
| 8,204,561 B2 * | 6/2012 | Mongan ................. A45C 11/00 206/592 |
| 8,851,771 B2 * | 10/2014 | Kaliebe ................. G06F 3/0202 400/472 |
| 9,785,194 B2 * | 10/2017 | Sprenger ............... G06F 1/1656 |

(Continued)

*Primary Examiner* — Anthony Q Edwards
(74) *Attorney, Agent, or Firm* — Grandview Law (57) ABSTRACT

Systems and methods are involved with but are not limited to a shell component including a first material member and a co-molded second material member, the first material member including a periphery, and one or more curvilinear edge surfaces extended along the periphery, the second material member including one or more portions adjacent one or more portions of the one or more curvilinear edge surfaces, the first material member of a first hardness value, the second material member of a second hardness value less than the first hardness value of the first material member; a key matrix circuit component adjacent one or more portions of a first surface of the first material member; and a plurality of key caps coupled to the key matrix circuit component. In addition, other aspects are described in the claims, drawings, and text forming a part of the present disclosure.

13 Claims, 11 Drawing Sheets

(56) References Cited

U.S. PATENT DOCUMENTS

| | | | |
|---|---|---|---|
| 2003/0083094 A1* | 5/2003 | Hsu | H04M 1/0202 455/550.1 |
| 2004/0100447 A1* | 5/2004 | Ozolins | G06F 3/021 345/170 |
| 2004/0114313 A1* | 6/2004 | Mata | H02G 11/00 600/301 |
| 2005/0130721 A1* | 6/2005 | Gartrell | H04M 1/0283 455/575.8 |
| 2007/0138920 A1* | 6/2007 | Austin | H05K 5/0217 312/7.1 |
| 2009/0162596 A1* | 6/2009 | Rios | A43B 13/04 428/45 |
| 2011/0284356 A1* | 11/2011 | Lan | H01H 13/88 200/5 A |
| 2012/0200504 A1* | 8/2012 | DeAngelo | G06F 3/0227 345/168 |
| 2012/0327580 A1* | 12/2012 | Gengler | G06F 1/1626 361/679.09 |
| 2014/0075214 A1* | 3/2014 | Spollen | G06F 1/1662 713/300 |
| 2018/0052527 A1* | 2/2018 | Serra-Martin | G06F 3/0238 |

* cited by examiner

KEYBOARD

SUMMARY

In one or more aspects, an apparatus includes, but is not limited to a shell component including a first material member and a co-molded second material member, the first material member including a periphery with a plurality of sides and with a plurality of corners, the first material member including a first surface, including a second surface facing away from the first surface, and the first material member including one or more curvilinear edge surfaces extended from the second surface along the periphery, the second material member including one or more portions adjacent one or more portions of the one or more curvilinear edge surfaces of the first material member, the first material member of a first hardness value, the second material member of a second hardness value less than the first hardness value of the first material member; a key matrix circuit component adjacent one or more portions of the first surface of the first material member; and a plurality of key caps coupled to the key matrix circuit component. In other one or more aspects, the apparatus includes a keyboard data cable; the second material member including one or more edge portions adjacent one or more portions of the one or more curvilinear edge surfaces of the first material member, the one or more edge portions of the second material member including one or more exterior surfaces with one or more grooves, the one or more grooves sized and shaped to removably couple with one or more portions of the keyboard data cable. In other one or more aspects, the apparatus includes the key matrix circuit component including a second surface; an elastomeric member having a first surface and a plurality of openings, each opening sized to allow for at least partial keycap passage therethrough, the first surface of the elastomeric sheet adjacent with one or more portions of the second surface of the key matrix circuit component, the elastomeric sheet positioned in at least one or more portions of the gap space between the plurality of key caps. In addition to the foregoing, other method aspects are described in the claims, drawings, and text forming a part of the disclosure set forth herein.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of portable electronic device case based articles of manufacture, compositions of matter, systems for producing and/or methods for producing same that may provide context, for instance, in introducing one or more processes and/or devices described herein.

FIG. 16 is a redrawn portion of FIG. 15 depicting key cap in fully depressed position whereas FIG. 15 depicts key cap in fully extended position.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
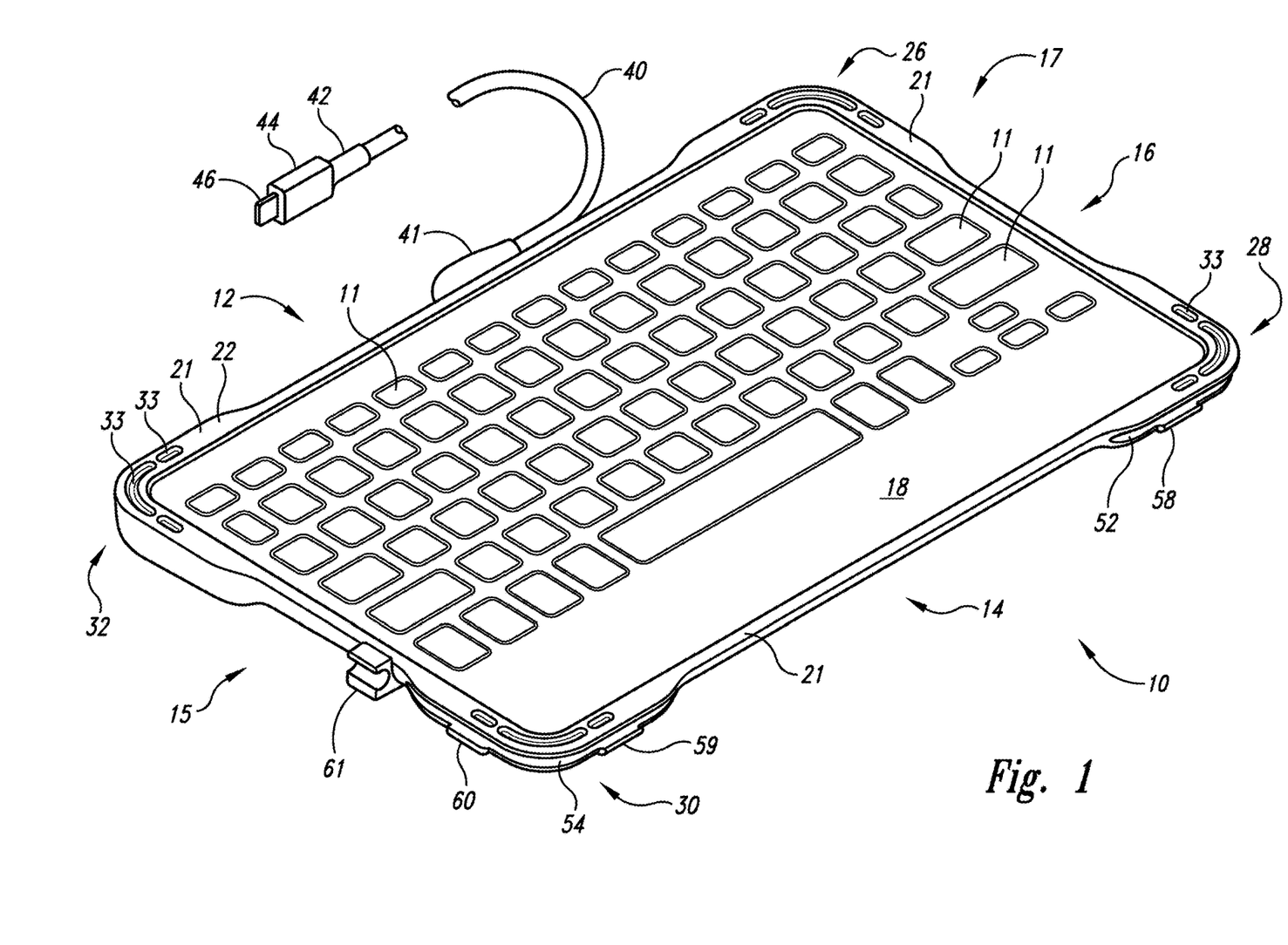
FIG. 1 is a front perspective view of a keyboard embodiment.

Turning to FIG. 1, shown in front perspective view is a first embodiment of keyboard 10 depicted in top plan view to include key caps 11 to be typically used by a keyboard user. As illustrative orientation labels to possibly aid discussion purposes, various reference numbers have been included herein such as top side 12, bottom side 14, left side 15, right side 16, front face 17, and rear face 19 (see FIG. 2). Keyboard 10 includes front face cover 18, first material member 20 (see FIG. 2), and second material member 21.

First material member 20 and second material member 21 are produced together by co-molding. First material member 20 can be made from such materials as polycarbonate materials or other hard materials such as other hard opaque plastic material. Second material member 21 can be made from such materials as thermoplastic polyurethane, thermoplastic elastomer, silicone materials, or other soft material such as other soft plastic material, which provides shock absorption and surfaces for handling qualities. Generally, first material member 20 has a hardness value greater than the hardness value of second material member 21. Hardness value is a material characteristic that is known to be generally expressed in terms of Shore A, Shore D, Rockwell, or other hardness measurement standards.

Figure 2:
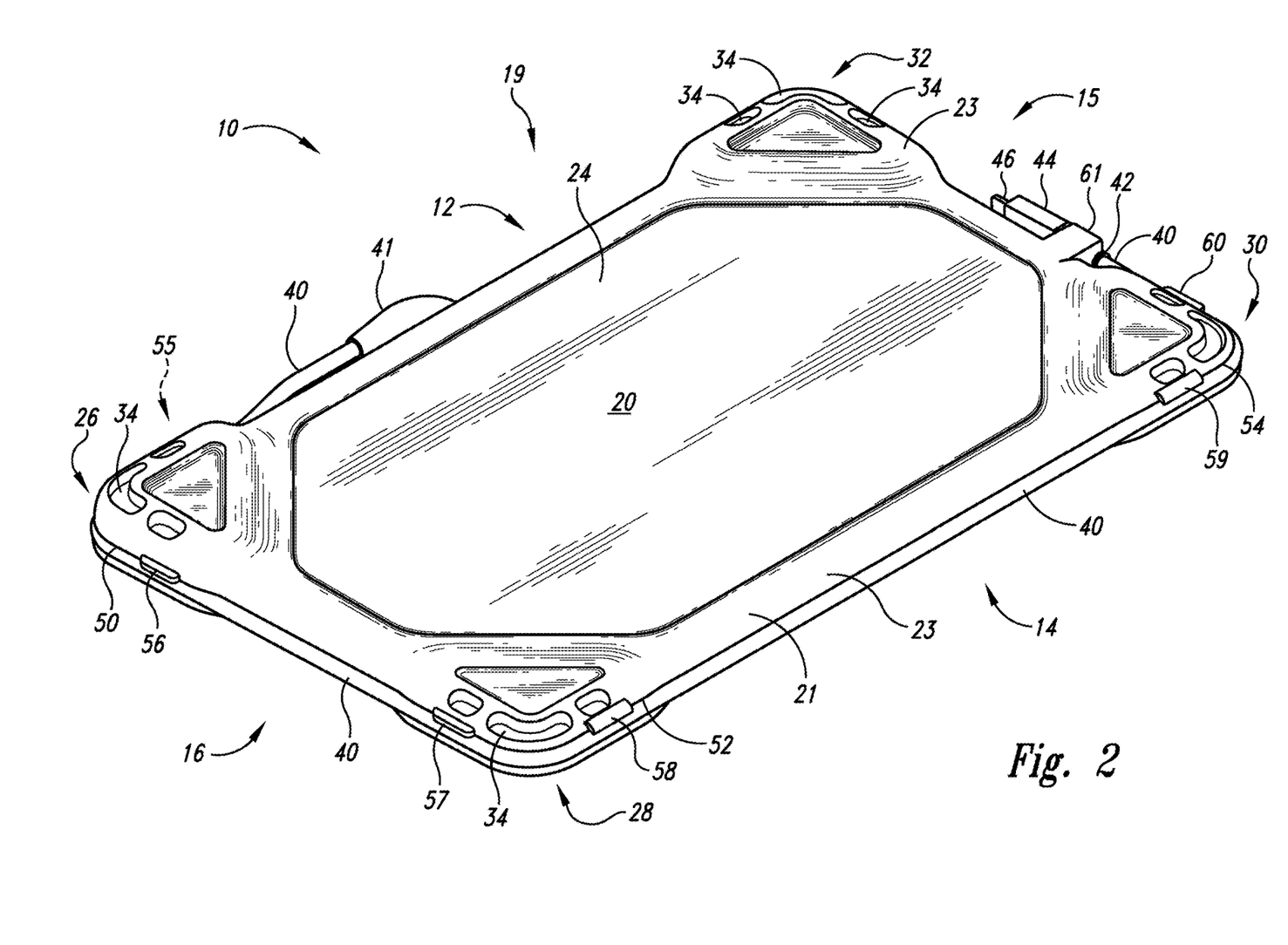
FIG. 2 is a rear perspective view of the keyboard embodiment of FIG. 1.

Second material member 21 includes front surface 22, and rear surface 23 (see FIG. 2). First material member 20 includes bare surface 24. Second material member 21 further includes first corner 26, second corner 28, third corner 30, fourth corner 32, front side indents 33, and rear side indents 34. Keyboard 10 further includes data cable 40 including strain-relief attachment end 41, strain-relief head end 42, head 44, and connector 46. One implementation of data cable 40 can include protocols for Lightning cord certification through Apple, Inc. MFi Program for keyboard connection with an appropriate computing device and other implementations can use other protocols such as for a universal serial bus connection with another appropriate type computing device. First corner 26, second corner 28, and third corner 30 of the second material member 21 include first groove portion 50, second groove portion 52, and third groove portion 54 (see FIG. 2), respectively. First corner 26, second corner 28, and third corner 30 of the second material member include first and second groove clips 55 and 56 (see FIG. 3), third and fourth groove clips 57 and 58, and fifth and sixth groove clips 59 and 60, respectively.

Figure 9:
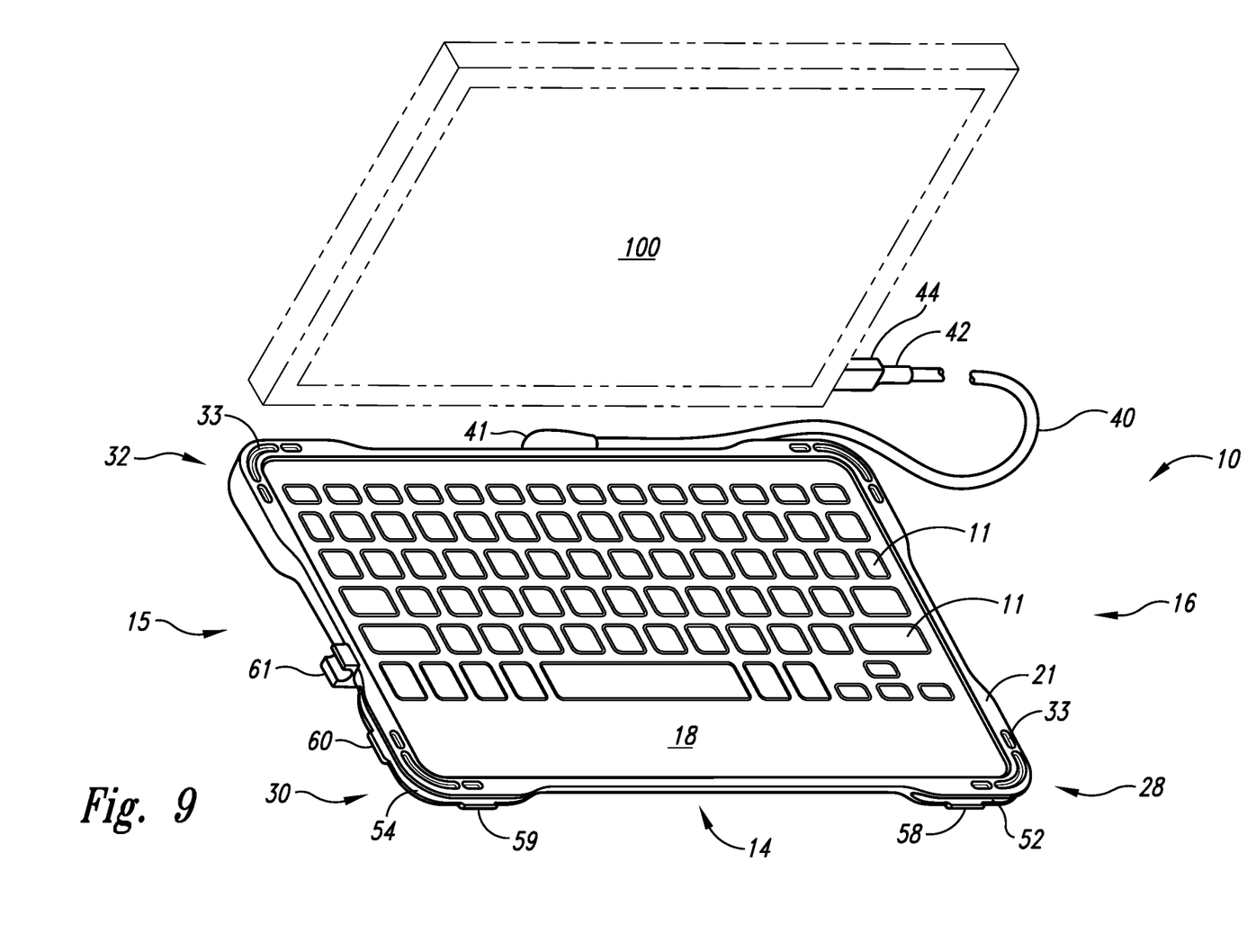
FIG. 9 is a front perspective view of the keyboard embodiment of FIG. 1 showing its keyboard data cable coupled with a computing device.

Data cable 40 is depicted in FIG. 1 as being fixedly coupled to one or more other portions of keyboard 10 through its strain-relief attachment 41 and is depicted as not being removably coupled with grooves 50-54 and associated groove clips 55-60, which would typically be the case if connector 46 were coupled to a computing device (such as computing device 100 in FIG. 9) to allow use of keyboard 10.

Turning to FIG. 2, shown in rear perspective view is keyboard 10 wherein portions of second material member 21 are shown covering portions of first material member 20 such as along the periphery of first material member 20 including top, bottom, left, and right sides 12-16 of keyboard 10 (also shown in FIG. 1), and those portions of first material member 10 also covered by first, second, third, and fourth corners 26-32 of second material member 21. Second material member 21 is also depicted as covering other portions of first material member 20 depicted in both FIGS. 1 and 2 with portions front face 17 and rear face 19 of keyboard 10 including covering by second material member 21.

Second material member 21 also includes rear side indents to enhance shock absorption qualities of the second material member. Data cable 40 is shown removably coupled with grooves 50-54, associated groove clips 55-60, and cable head clip 61 to provide convenience with storage or transport of keyboard 10. Top and bottom plan views of keyboard 10 are shown in FIGS. 3 and 4, respectively, and top side, bottom side, left side and right side elevational views of keyboard 10 are shown in FIGS. 5-8, respectively, to allow for further visual depiction of various aspects of keyboard 10 elaborated above.

Figure 10:
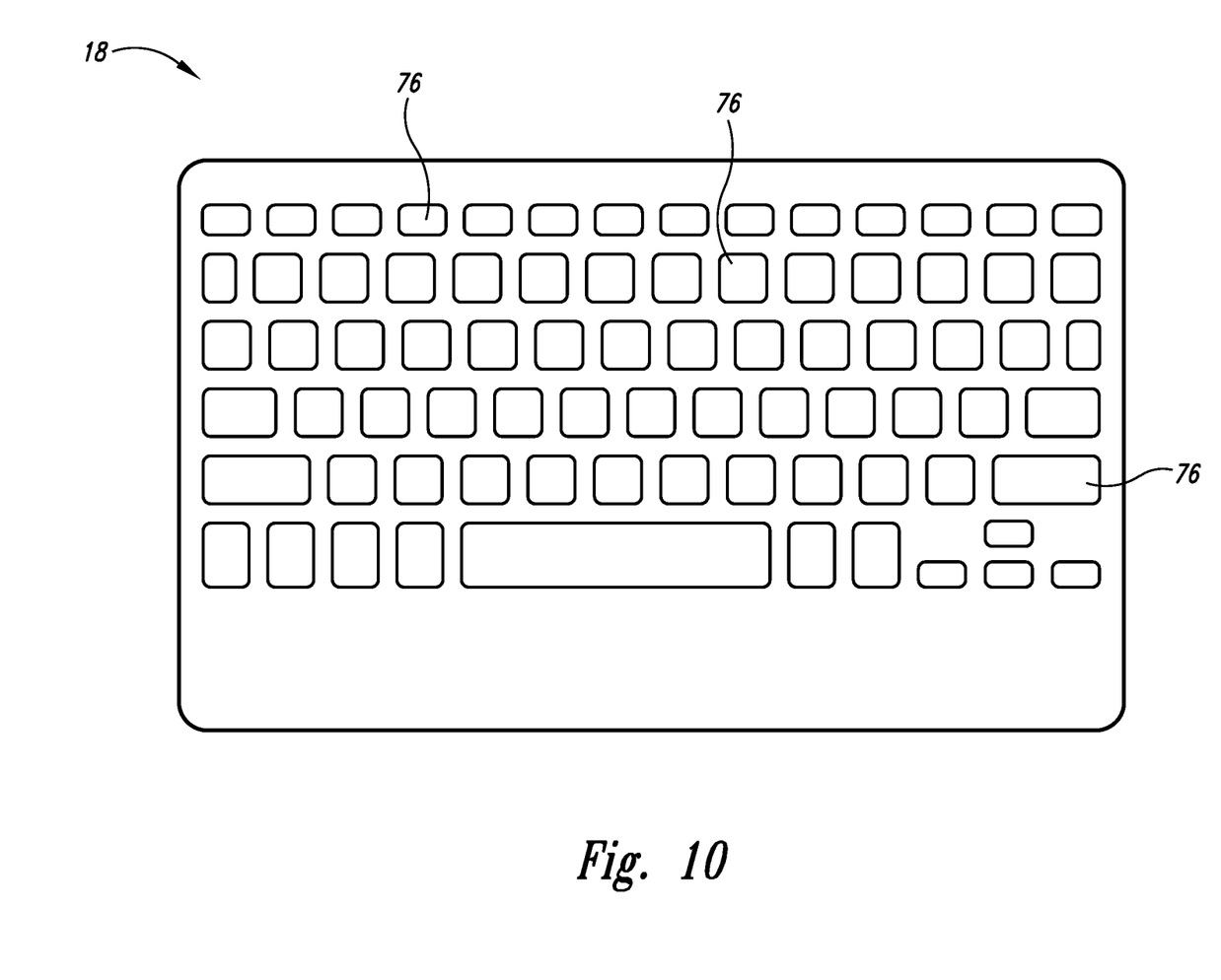
FIG. 10 is a top plan view of a front face cover of the keyboard embodiment of FIG. 1.
Figure 11:
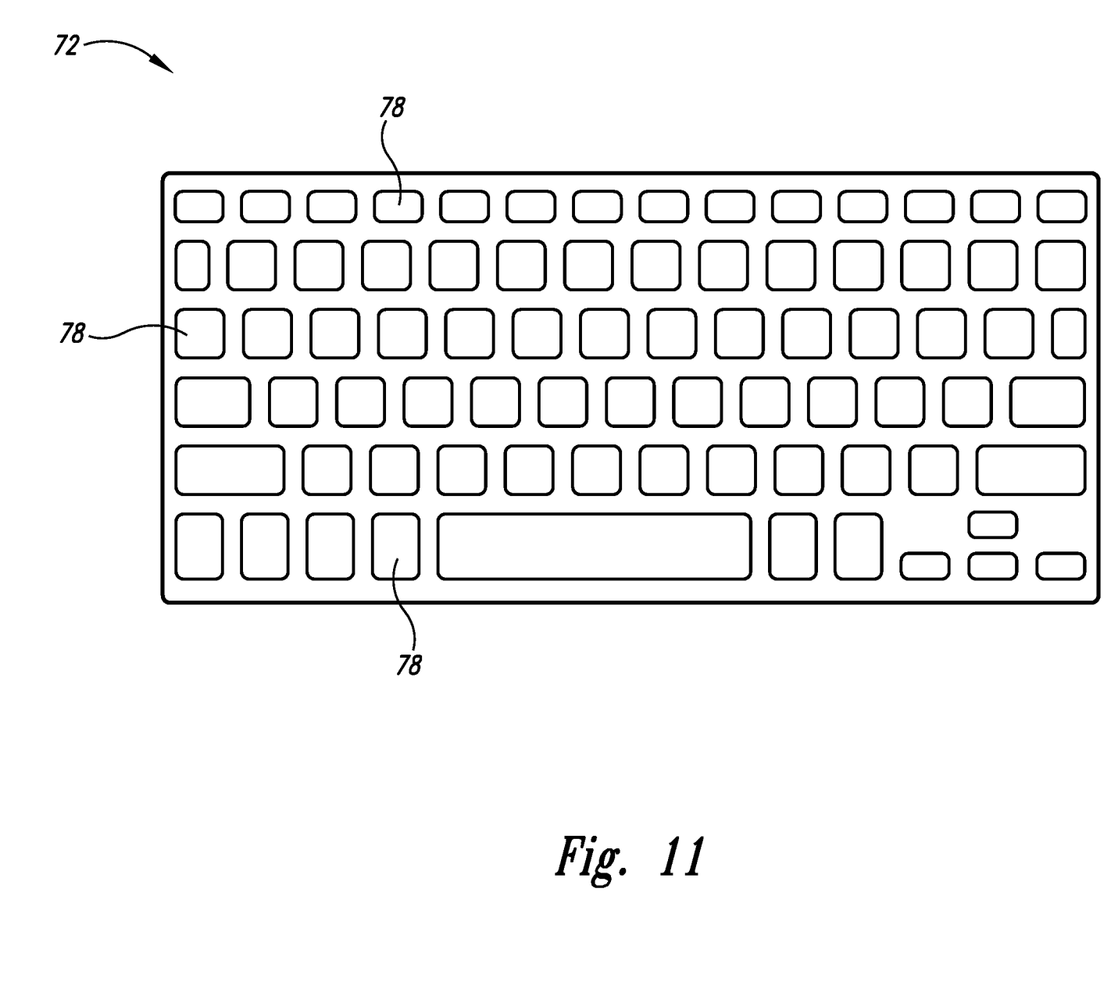
FIG. 11 is a top plan view of an seal member of the keyboard embodiment of FIG. 1.

The embodiment of front face cover 18 shown in FIG. 10 in top plan view serves as a sheet-like member and can be made from such materials as polycarbonate materials. Front face cover 18 includes front face cover openings 76 so shaped and sized to allow for partial passage of key caps 11 therethrough as further depicted with FIGS. 12-16. Seal member 72 depicted in FIG. 11 in top plan view serves as a sheet-like member and can be made from such elastomeric materials as silicone. Seal member 72 includes seal member openings 78 so shaped and sized to allow for partial passage of key caps 11 therethrough as further depicted with FIGS. 12-16.

Figure 3:
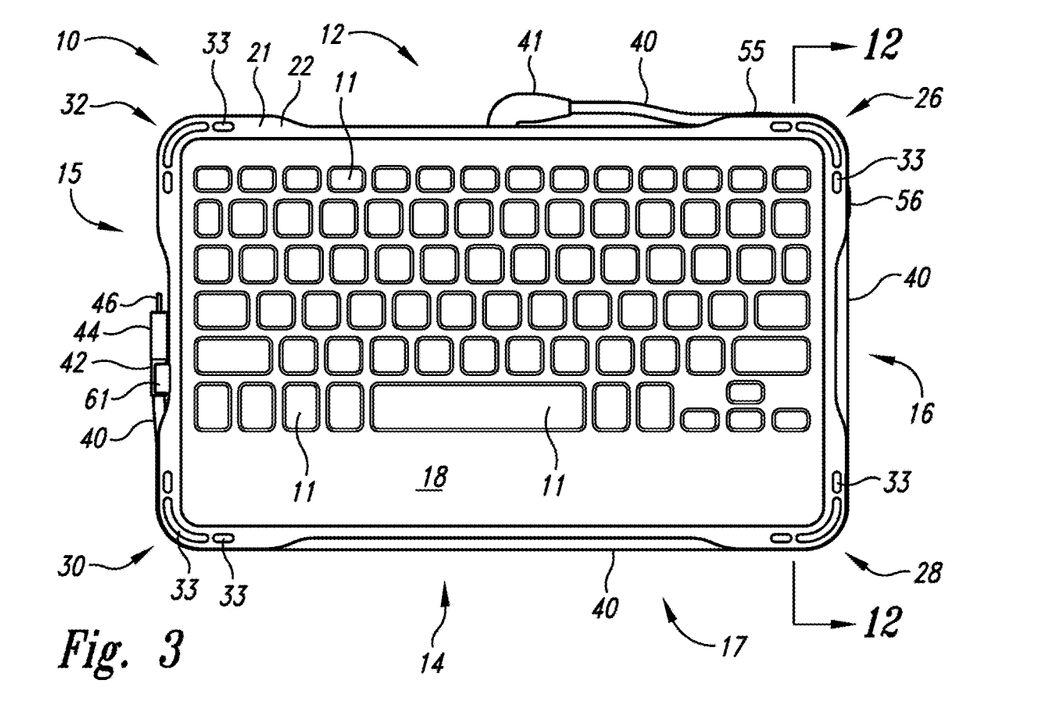
FIG. 3 is a top plan view of the keyboard embodiment of FIG. 1.
Figure 4:
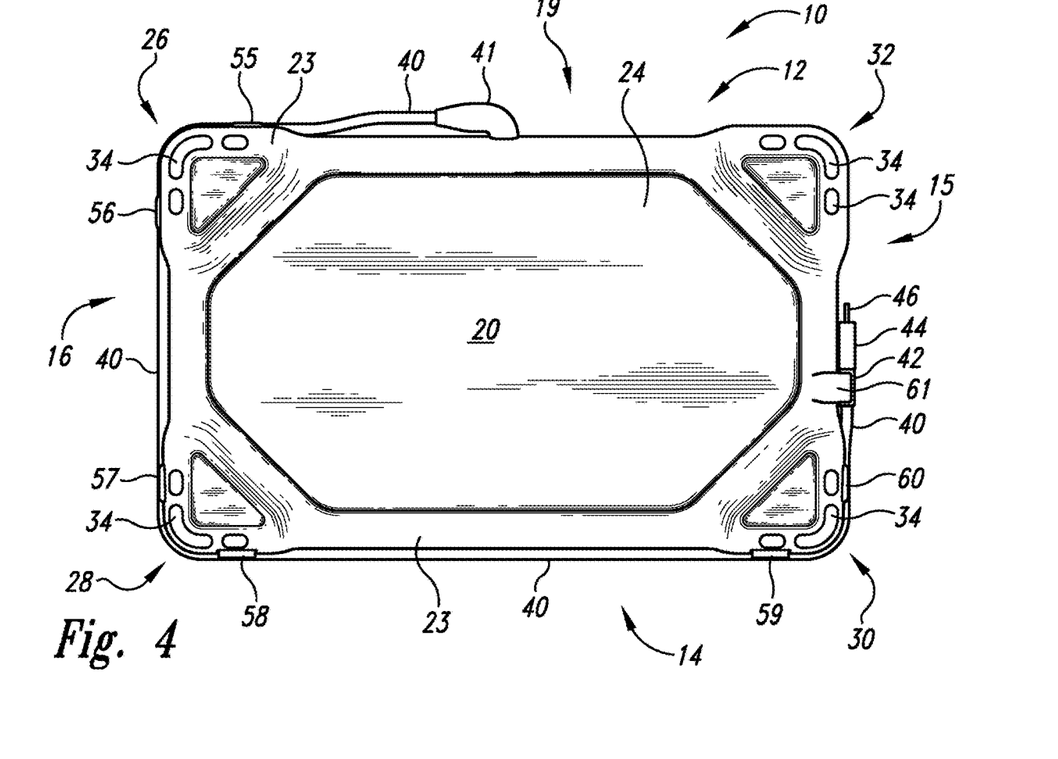
FIG. 4 is a bottom plan view of the keyboard embodiment of FIG. 1.
Figure 5:
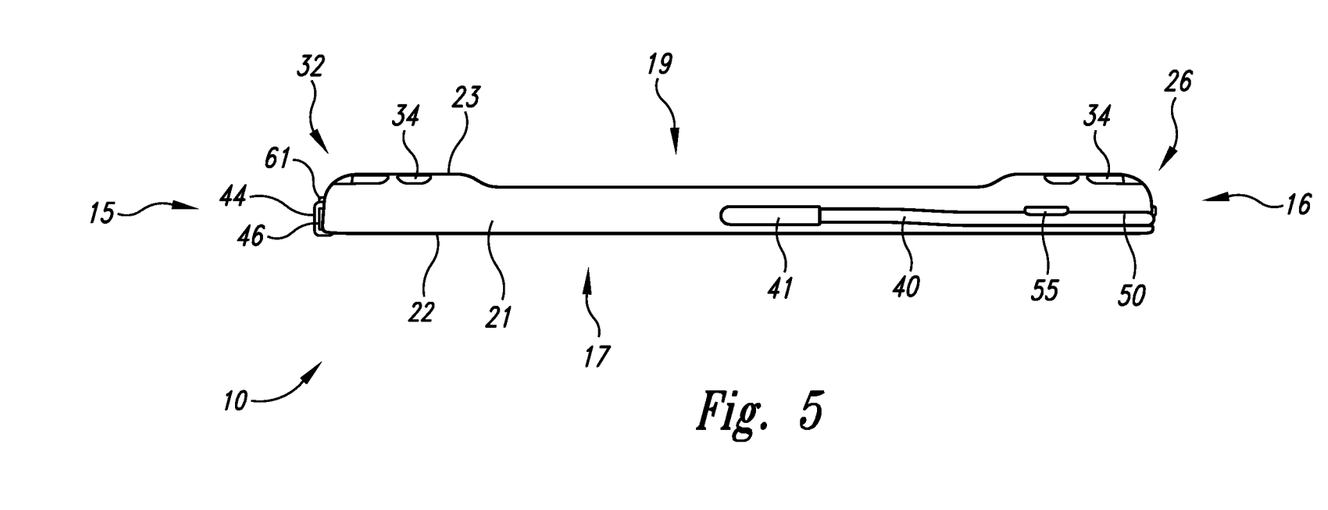
FIG. 5 is a top side-elevational view of the keyboard embodiment of FIG. 1.
Figure 6:
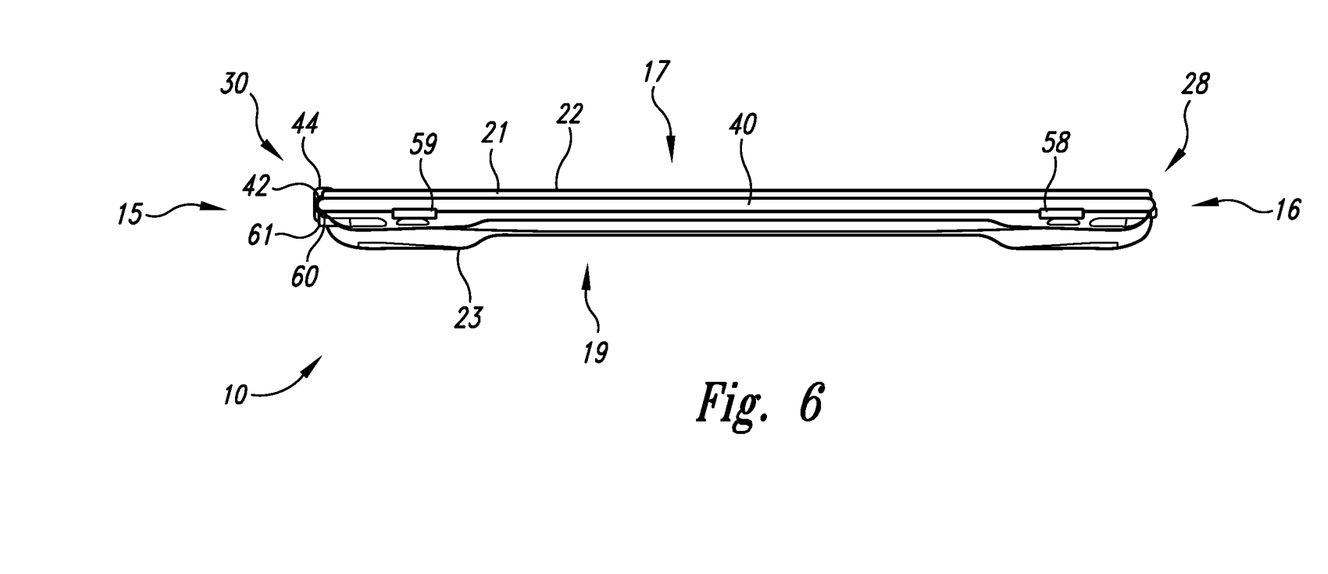
FIG. 6 is a bottom side-elevational view of the keyboard embodiment of FIG. 1.
Figure 7:
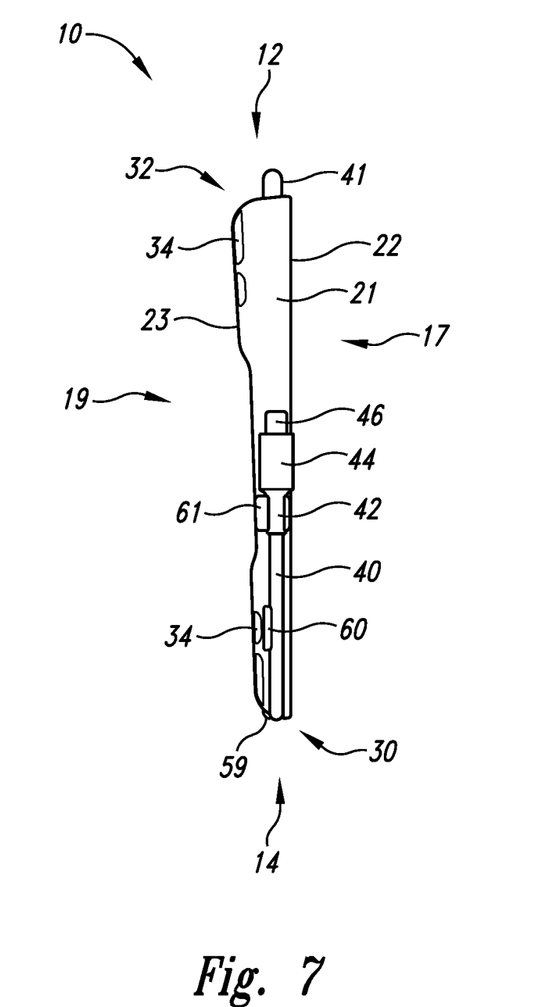
FIG. 7 is a left side-elevational view of the keyboard embodiment of FIG. 1.
Figure 8:
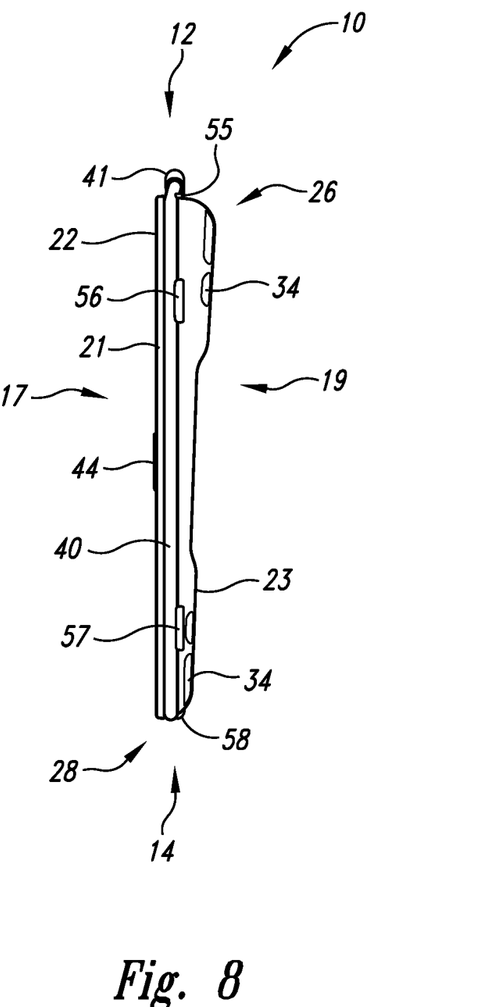
FIG. 8 is a right side-elevational view of the keyboard embodiment of FIG. 1.
Figure 12:
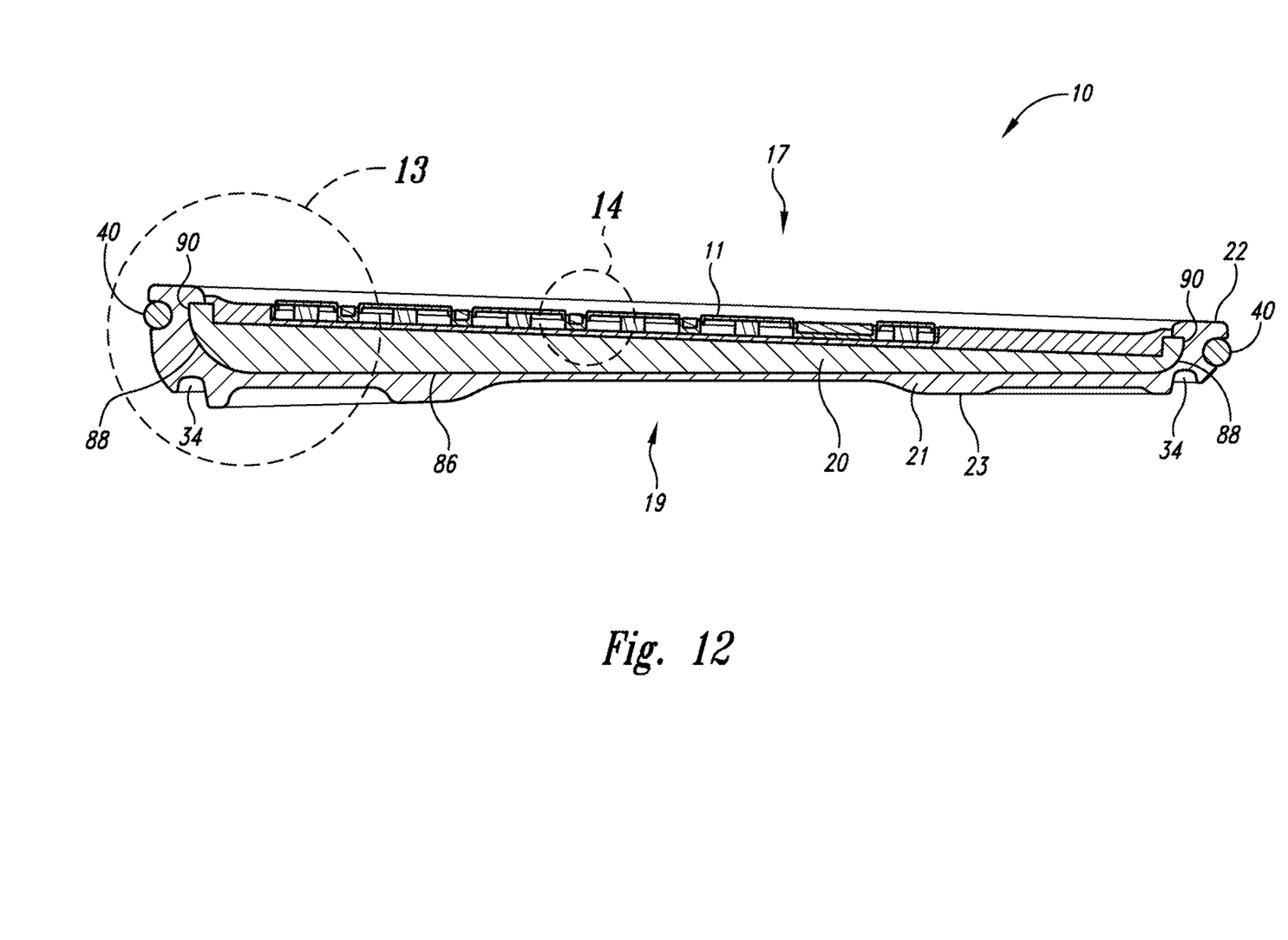
FIG. 12 is a cross-sectional side-elevational view of the keyboard embodiment of FIG. 1 along the 12-12 cut line of FIG. 3.
Figure 13:
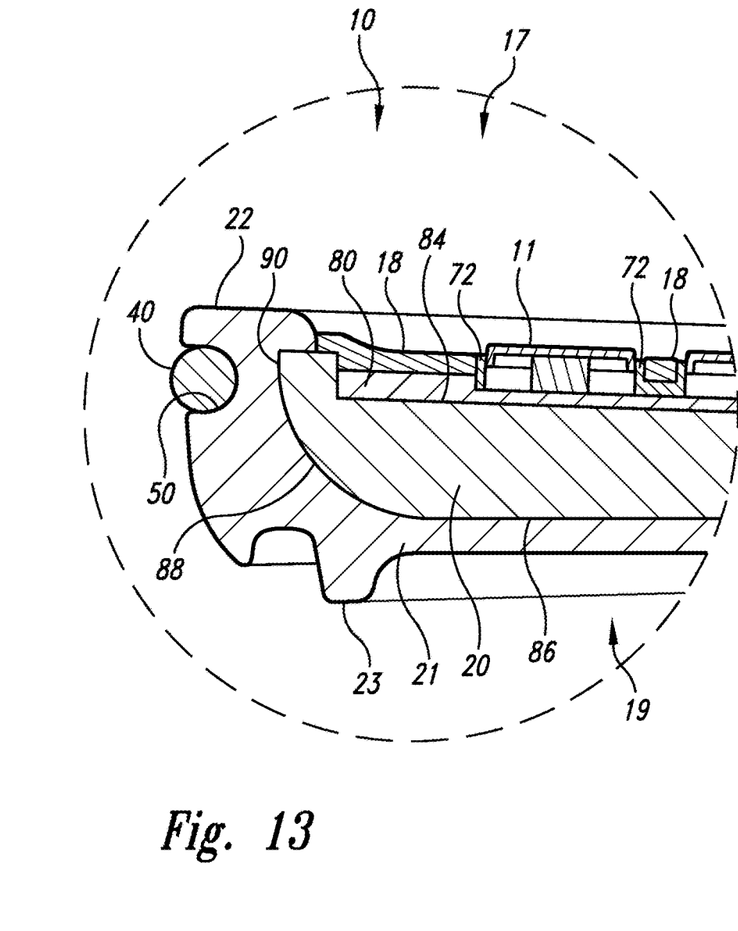
FIG. 13 is an enlarged cross-sectional side-elevational view of a dashed-circle-designated "13" portion of the keyboard embodiment of FIG. 12, which is a cross-sectional side-elevational view along the 12-12 cut line of FIG. 3.
Figure 14:
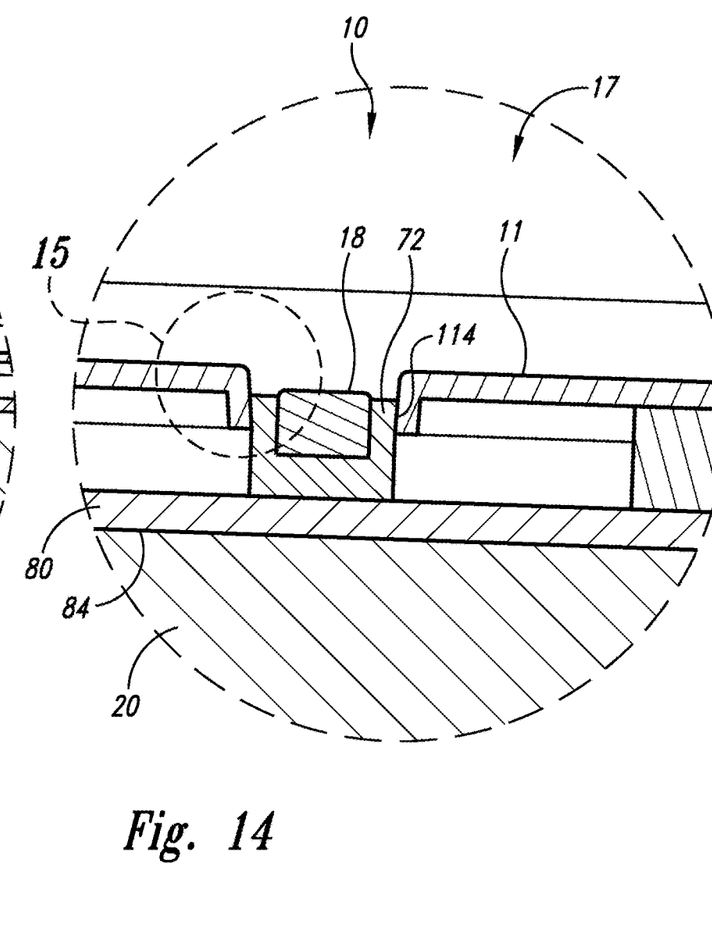
FIG. 14 is an enlarged cross-sectional side-elevational view of a dashed-circle-designated "14" portion of the keyboard embodiment of FIG. 12, which is a cross-sectional side-elevational view along the 12-12 cut line of FIG. 3.

Turning to FIG. 12, keyboard 10 is shown in cross-sectional side-elevational view along the 12-12 cut line of FIG. 3. To further illustrate, FIGS. 13 and 14 show enlarged cross-sectional side-elevational views of a dashed-circle-designated "13" and "14" portions, respectively, of keyboard 10 in FIG. 12. As further shown in FIGS. 12-14, keyboard 10 further includes key matrix circuit component 80 with a plurality of key switches 82 coupled thereto. Further coupled to key switches 82 are key caps 11.

Shown in FIGS. 12-14, first material member 20 includes substantially planar first surface 84. First material member further includes second surface 86, which faces away from first surface 84. Second surface 86 of second material member 21 is also co-planar with bare surface 24 of second material member (see FIG. 2). First material member 20 includes curvilinear edge surface 88 extended from second surface 86 along the periphery of first material member 20. Key matrix circuit component 80 is depicted positioned adjacent second surface 86 of first material member 20. First material member 20 includes lip extension 90, which extends perpendicularly to first surface 84 of the first material member along the periphery of first material member 20.

FIGS. 12-14 further show seal member 72 positioned adjacent key matrix circuit component 80 and front face cover 18 positioned adjacent seal member 72 with key caps 11 partially passing through front face cover openings 76 and partially passing through seal member openings 78. Front face cover openings 76 are shown to be larger than seal member openings 78 so that the elastomeric material of seal member 72 contacts key caps 11 to allow for such benefit as hindering dust, etc. from undesirable entry into interior spaces of keyboard 10.

Figure 15:
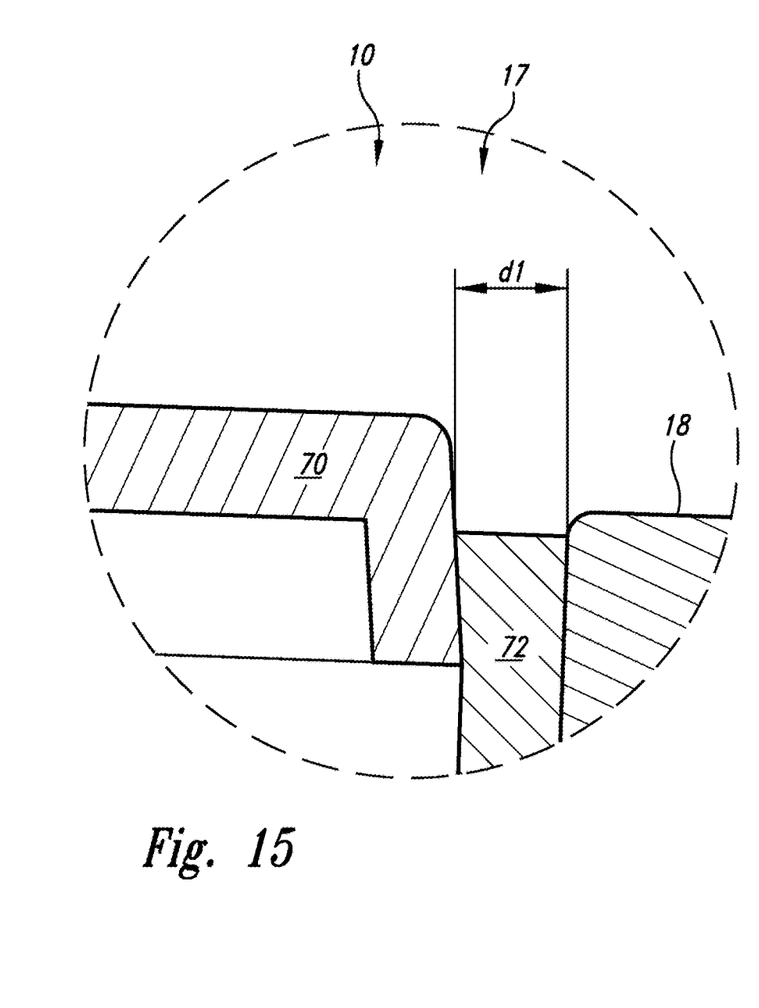
FIG. 15 is an enlarged cross-sectional side-elevational view of a dashed-circle-designated "15" portion of the keyboard embodiment of FIG. 14, which is an enlarged cross-sectional side-elevational view of a dashed-circle-designated "14" portion of the keyboard embodiment of FIG. 12, which is a cross-sectional side-elevational view along the 12-12 cut line of FIG. 3.
Figure 16:
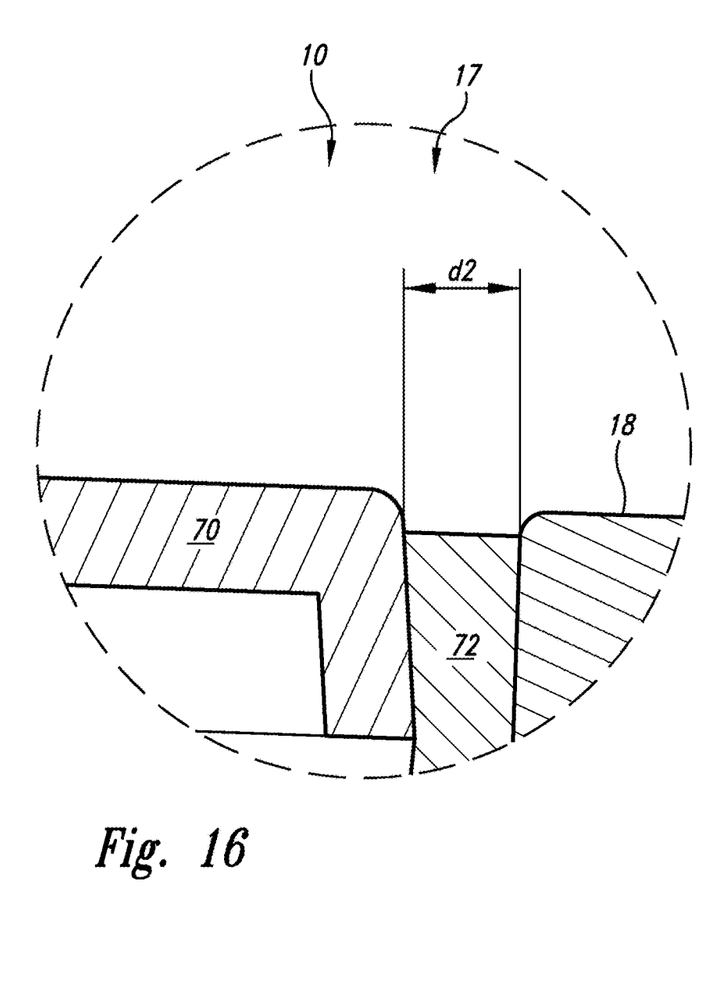

FIGS. 15 and 16 further show how seal member 72 stays in contact with key caps 11 when a particular one of the key caps 11. When the particular key cap 11 depicted is fully extended (see FIG. 15), the upper width of the relevant portion of seal member 72 is "d1." When the particular key cap 11 depicted is fully depressed (see FIG. 16), the upper width of the relevant portion of seal member 72 is "d2" which is greater than d1 to allow for that portion of seal member 72 to remain in contact with the particular key cap 11.

General manufacturing considerations can include use of tools to create metal (e.g. steel) moldings to first receive heated-melted material for solidification to form first material member 20 and subsequently receiving other heated-melted material to be overmolded for solidification to form second material member 21 to cover portions of first material member 20 as described above. Other molding processes can be used to manufacture front face cover 18 and seal member 72 for subsequent assembly along with data cable 40, key matrix circuit component 80, key switches 82, and associated fasteners, connections, etc. to produce keyboard 10.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A keyboard assembly comprising:
    a shell component including a first material member and a co-molded second material member,
        the first material member including a periphery with a plurality of sides and with a plurality of corners, the first material member including a first surface, the first material member including a second surface facing away from the first surface, and the first material member including one or more curvilinear edge surfaces extended from the second surface along the periphery,
        the second material member including one or more portions adjacent one or more portions of the one or more curvilinear edge surfaces of the first material member,
        the first material member of a first hardness value, the second material member of a second hardness value less than the first hardness value of the first material member;
    a key matrix circuit component adjacent one or more portions of the first surface of the first material member; and
    a plurality of key caps coupled to the key matrix circuit component;
    wherein the second material member includes one or more portions adjacent one or more portions of the second surface of the first material member and
    wherein the first material member further comprises a lip extension extended perpendicularly to the first surface of the first material member along the periphery of the first material member, the second material member including one or more portions adjacent one or more portions of the lip extension of the first material member.

2. The keyboard assembly of claim 1 wherein the second material member includes one or more portions adjacent one or more portions of the plurality of corners of the first material member.

3. The keyboard assembly of claim 2 wherein the second material member includes one or more exterior surfaces with a plurality of indents.

4. The keyboard assembly of claim 1 wherein the second hardness of the second material is less than the first hardness of the first material in terms of Shore A, Shore D, or Rockwell measurement standards.

5. The keyboard assembly of claim 1 wherein the first material includes one or more polycarbonate materials.

6. The keyboard assembly of claim 1 wherein the second material includes one or more thermoplastic polyurethane, thermoplastic elastomer, or silicone materials.

7. The keyboard assembly of claim 1 further comprising a keyboard data cable, wherein the second material includes one or more exterior surfaces and one or more grooves in one or more portions of the one or more exterior surfaces, the one or more grooves shaped and sized to removably couple with one or more portions the keyboard data cable.

8. The keyboard assembly of claim 1 further comprising an elastomeric material including one or more portions adjacent one or more portions of the plurality of key caps.

9. A keyboard assembly comprising:
    a keyboard data cable;

a shell component including a first material member and a co-molded second material member,
   the first material member including a periphery with a plurality of sides and with a plurality of corners, the first material member including one or more curvilinear edge surfaces extended along the periphery, the first material member including a first surface;
   the second material member including one or more edge portions adjacent one or more portions of the one or more curvilinear edge surfaces of the first material member, the one or more edge portions of the second material member including one or more exterior surfaces with one or more grooves, the one or more grooves sized and shaped to removably couple with one or more portions of the keyboard data cable;
a key matrix circuit component adjacent one or more portions of the first surface of the first material member; and
a plurality of key caps coupled to the key matrix circuit component.

10. The keyboard assembly of claim 9, the first material member further comprising a second surface facing away from the first surface of the first material member and further comprising a lip extension perpendicular to the first side of the first material member wherein the second material member includes one or more portions adjacent to one or more portions of the second surface of the first material member, the second material member includes one or more portions adjacent to one or more portions of the lip extension of the first material member, and the second material member includes one or more portions adjacent to one or more portions of the plurality of corners of the first material member.

11. The keyboard assembly of claim 9 wherein the second hardness of the second material is less than the first hardness of the first material in terms of Shore A, Shore D, or Rockwell measurement standards.

12. The keyboard assembly of claim 9 wherein the second material further includes one or more clip portions adjacent to the one or more grooves, the one or more clip portions sized and shaped to removably couple with the keyboard data cable.

13. The keyboard assembly of claim 9 further comprising an elastomeric material adjacent one or more portions of the plurality of key caps.

\* \* \* \* \*